United States Patent [19]

Dyer

[11] Patent Number: 5,216,784
[45] Date of Patent: Jun. 8, 1993

[54] CONDUIT CLAMP

[75] Inventor: Edward P. Dyer, Germantown, Wis.

[73] Assignee: Tyton Corporation, Milwaukee, Wis.

[21] Appl. No.: 892,430

[22] Filed: Jun. 1, 1992

Related U.S. Application Data

[63] Continuation-in-part of Ser. No. 772,479, Oct. 7, 1991, abandoned.

[51] Int. Cl.⁵ .............................................. B65D 63/00
[52] U.S. Cl. .................. 24/20 TT; 24/20 R; 24/20 EE
[58] Field of Search ............ 24/20 R, 20 TT, 20 EE, 24/20 CW, 16 R, 23 EE, 270, 273, 543; 285/921

[56] References Cited

U.S. PATENT DOCUMENTS

| | | | |
|---|---|---|---|
| 973,532 | 10/1910 | McLaughlin | 24/20 TT |
| 1,786,612 | 12/1930 | Heslop | 24/20 TT |
| 2,551,384 | 5/1951 | Middleton et al. | 24/20 EE |
| 3,540,224 | 11/1970 | Pogonowski | 24/20 TT |
| 4,128,918 | 12/1978 | Wenk | 24/16 R |
| 4,183,120 | 1/1980 | Thorne | 24/20 TT |
| 4,306,740 | 12/1981 | Kleykamp et al. | 24/20 TT |
| 4,312,525 | 1/1982 | Kleykamp | 24/20 TT |
| 4,468,840 | 9/1984 | Sauer et al. | 24/20 R |

Primary Examiner—Victor N. Sakran

[57] ABSTRACT

A snap-on clamp includes an open-ended loop having complementary, interlocking clamps at each end. The clamps each include a jaw portion having teeth opposed to and engageable with the teeth on the other jaw portion. The teeth are angled to permit sliding movement toward a closed position and are lockable against movement toward an open position. Each clamp also includes an opposed tongue portion which engages the opposite surface of the jaw portion on the other clamp for resiliently resisting separation of the teeth and at least one of the tongue or jaw portions includes at least one locking tab engaging the adjacent tongue or jaw portion of the other clamp to prevent relative lateral movement of the jaw portions.

11 Claims, 3 Drawing Sheets

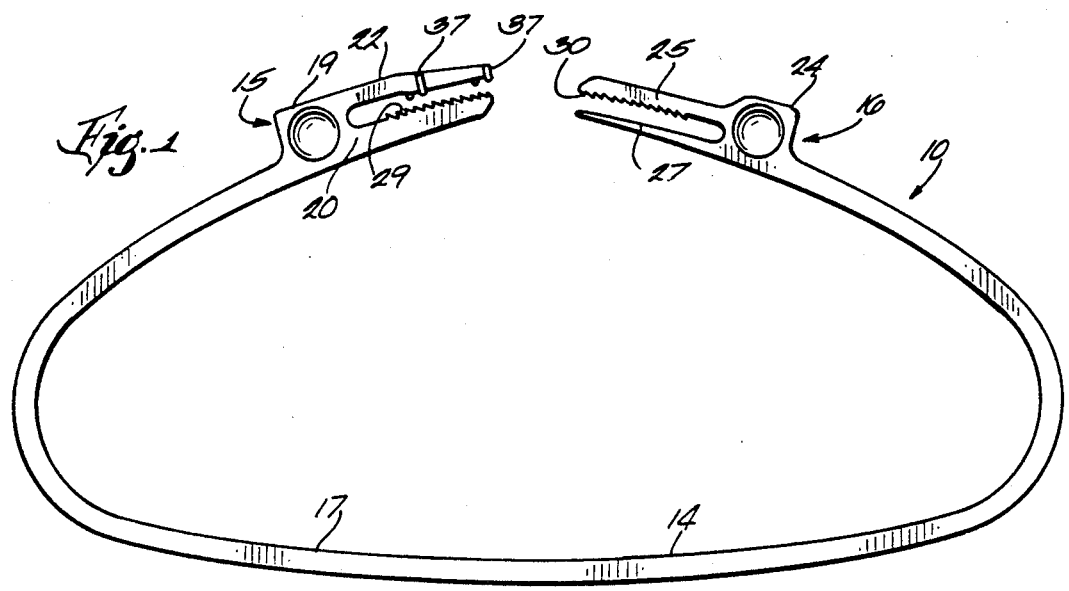
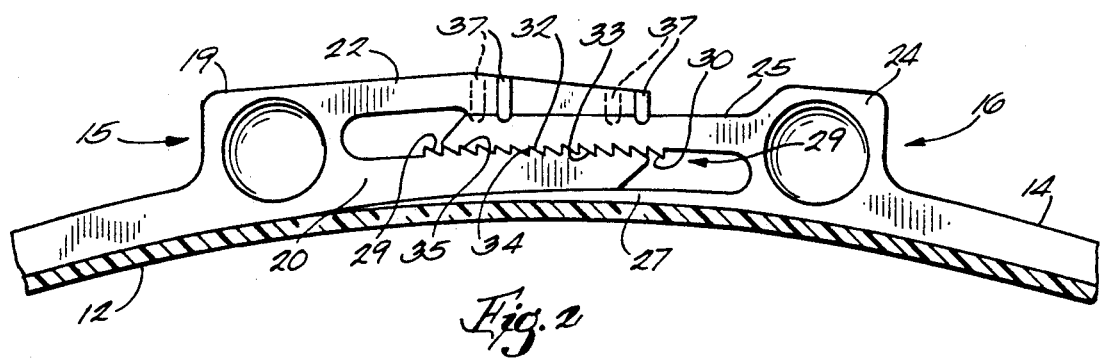
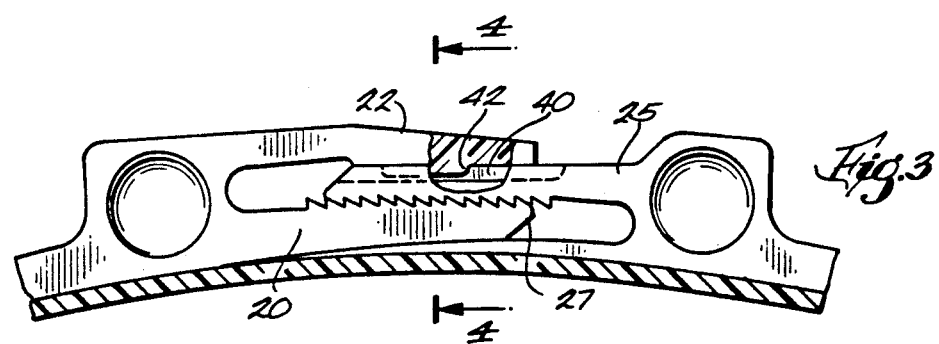
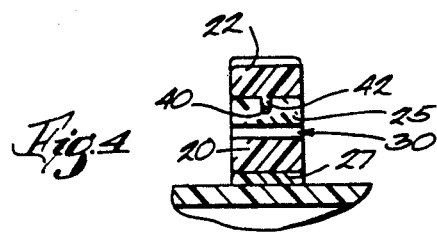

CONDUIT CLAMP

This is a continuation-in-part of co-pending application Ser. No. 07/772,479 filed Oct. 7, 1991, abandoned.

This invention relates to clamps for securing conduits and the like.

One type of conduit clamp comprises an open loop or band of a polymeric material having complementary, interlocking clamps at each end. The clamps include jaw portions having opposed, engageable teeth angled to permit sliding movement toward a closed position but which interlock to oppose movement toward an open position. Such clamps also commonly include tongue portions resiliently engageable with the opposite sides of the jaw portions for biasing the teeth against separation. Conduit clamps of this type are disclosed, for example, in U.S. Pat. Nos. 4,128,918, 4,306,740, and 4,312,525.

Such prior art conduit clamps are not wholly satisfactory because while they resisted separation of the clamping members in a circumferential direction, under certain circumstances, lateral separation of the clamping members is still possible.

Another type of clamp is described in U.S. Pat. No. 4,183,120, which utilizes retaining tabs on both axially opposite sides of the teeth on one of the clamp jaws for guiding the other clamp jaw as it slides to a closed position to resist lateral separation of the clamp jaws. Such guide tabs create problems in the molding of the clamp. With guide tabs located on both axially opposite sides of the jaw, the clamp cannot be molded using a high-speed, low-cost, single opening direction mold and its corresponding molding machine. The mold for prior art clamps must be of the compound type; that is, the mold must have a compound opening action allowing dual opening directions of the mold along two axes which are at right angles to each other in order to allow removal of the clamp from the mold cavity. Compound molds are more time-consuming and expensive to manufacture than single opening direction molds and can only be used on a more expensive molding machine designed to provide the dual or compound opening directions. Further, compound opening action-type molding machines have a significantly slower cycling time than a single opening direction molding machine, thus reducing production capacity. The foregoing factors significantly increase the cost of prior art clamps.

SUMMARY OF THE INVENTION

It is an object of the invention to provide a new and improved conduit clamp.

Another object of the invention is to provide a conduit clamp having clampable jaw portions which resist separation in both the lateral and circumferential directions and that can be formed in a mold having a single direction opening action.

These and other objects and advantages of the invention will become more apparent when taken together with the drawings and the detailed description thereof.

In general terms, the invention comprises a clamp including band means formed into a loop, first and second clamp means disposed, respectively, on the opposite ends of the band means, the first clamp means including first and second spaced apart portions extending toward the second clamp means and the second clamp means including a third portion extending toward the first clamp means, the third portion of the second clamp means is received between first and second portions of the first clamp means, first teeth means on the first portion and second teeth means on the third portion, the first and second teeth means being engageable and complementary, the teeth means being constructed and arranged to permit relative movement of the first and second clamp means toward each other but resisting relative movement of the clamp means in the opposite direction, and locking means on one of the first and second portions and engageable with the third portion for preventing lateral movement of the first clamp means relative to the second clamp means.

BRIEF DESCRIPTION OF THE DRAWINGS

FIG. 1 is a side view showing a preferred embodiment of a conduit clamp according to the preferred embodiment of the invention;

FIG. 2 an enlarged view showing a portion of the conduit clamp illustrated in FIG. 1;

FIG. 3 is an enlarged fragmentary view showing an alternate embodiment of the invention;

FIG. 4 is a view taken along lines 4—4 of FIG. 3;

DETAILED DESCRIPTION OF THE PREFERRED EMBODIMENT

Figure 5:
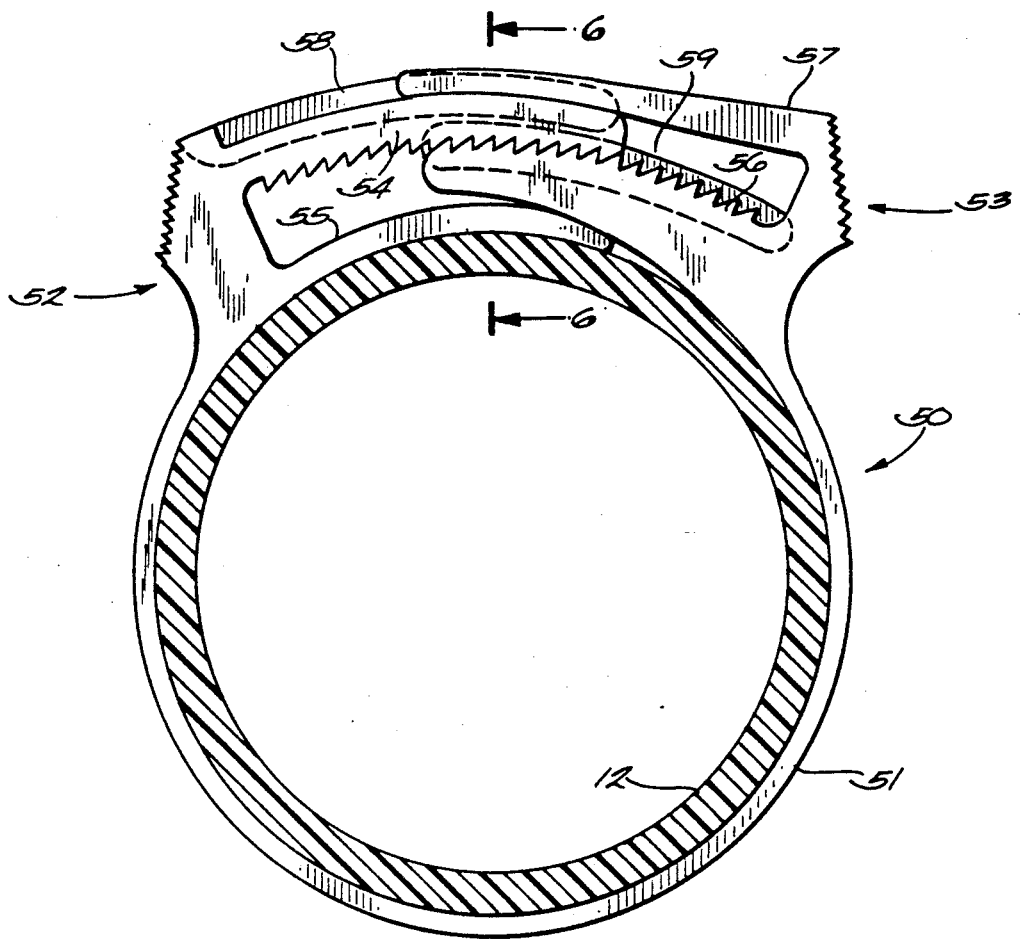
FIG. 5 is a side view showing an alternate embodiment of the invention.

FIGS. 1 and 2 show a clamp 10 according to the preferred embodiment of the invention for securing a conduit such as 12. The clamp 10 includes a band 14 formed in an open-ended loop and having complementary, interlocking clamps 15 and 16 integrally formed on each end. While the band 14 is shown in FIG. 1 to be generally oval, those skilled in the art will appreciate that the shape of the band is 14 can have any shape as required to clamp the conduit 12 being secured. In addition, the cross sectional configuration of the band 14 may have any convenient shape commensurate with the required strength, the composition of the material being employed and the method of manufacture. In the illustrated embodiment, the band 14 is generally rectangular in transverse cross section. Moreover, the inner surface 17 of the band 14 is preferably free of irregularities and is configured for engagement with the outer surface of conduit 12 along substantially the entire length of the band 14.

The clamps 15 and 16 are complementary and each includes an opposed, interlocking jaw portion and a resilient tongue portions which biases the jaw portions toward locking engagement. In particular, the clamp 15 includes a head 19 integrally formed on one end of band 14 and having a jaw 20 extending in the circumferential direction from its lower end and the tongue 22 extending from its upper end in a spaced apart, parallel relation to jaw 20. Similarly, the clamp 16 includes a head 24 integrally formed on the other end of band 14 and an upper jaw 25 extending in an opposite direction relative to jaw 20. There is also a second tongue 27 extending from the lower end of head 24 and spaced below the jaw 25.

As seen in FIGS. 1 and 2, a row of teeth 29 is formed on the upper surface of the jaw 20 and a second row of teeth 30 are formed on the lower surface of jaw 25. When the clamps 15 and 16 are in their clamped position as shown in FIG. 2, the teeth 29 are in engagement with the teeth 30, the tongue 22 engages the upper surface of jaw 25 and the tongue 27 engages the lower surface of jaw 20.

As seen in FIG. 2, the teeth 29 and 30 are complementary and are formed so that the jaws 20 and 25 can slide toward a locking position, but are locked against movement in the opposite direction. In particular, the teeth 29 are formed of intersecting surfaces 30 and 32, both of which form an acute angle relative to the direction of locking movement and are inclined rearwardly relative to the jaw 20. Similarly, the teeth 30 are formed of intersecting surfaces 34 and 35 which are inclined rearwardly relative to jaw 25 and at the same angles as surfaces 30 and 32. Thus, both the teeth 29 and 30 are inclined away from the forward direction and toward the locked position and the surfaces 32 and 34 are inclined to permit movement in the forward direction. However, engagement between the surfaces 33 and 35 prevent movement in the opposite direction.

The tongue 22 engages the upper surface of the jaw 25, and the tongue 27 engages the lower surface of the jaw 20. When the jaws are in their locked position, the tongues 22 and 27 urge the jaws 20 and 25 toward each other. In addition, the lower surface of the jaw 20 and the tongue 27 form a continuation of the inner surface of loop 14.

While the teeth 29 and 30 prevent movement of the clamps 15 and 16 from opening in the circumferential direction, they do not inhibit relative movement in the lateral direction. To prevent such lateral relative movement of the jaws, locking means comprising pairs of retaining tabs 37 are formed on each side of the tongue 22. The tabs 37 extend below the lower surface of tongue 22 for engaging the sides of jaw 25. This prevents movement of the jaw 25 in the lateral direction relative to the clamp 15. While the locking tabs 37 are shown on the tongue 22, the tabs could alternately be formed on the jaw 25 and extend either upwardly for engaging the tongue 22 or downwardly for engaging the jaw 20. Similarly, the tabs could be formed on the jaw 25 or the tongue 27.

FIGS. 3 and 4 show an alternate embodiment of the invention wherein the locking means comprises a longitudinal groove 40 formed in the upper surface of the jaw 25 and an elongate tab or fin 42 extending longitudinally and downwardly from the lower surface of the tongue 22 and in parallelism with the groove 40. When the clamps 15 and 16 are moved into a closed position, the fin 42 will slide through the open front end of the groove 40 and along the groove to prevent relative lateral movement of the clamps 15 and 16.

Figure 6:
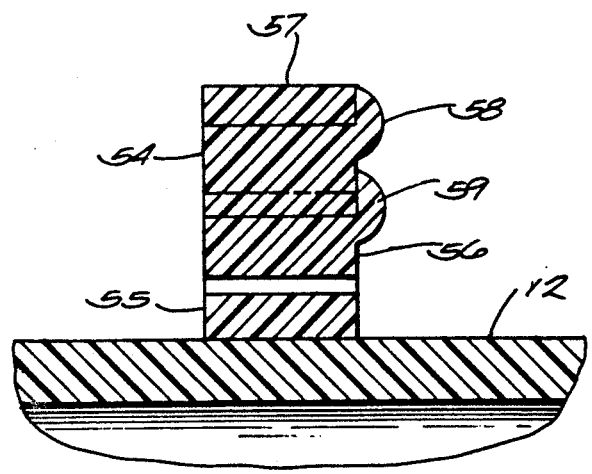
FIG. 6 is a view taken along lines 6—6 of FIG. 5.

FIGS. 5 and 6 illustrate an alternate embodiment of the invention and includes a band 51 for engaging conduit 12 and having a first clamp 52 and a second clamp 53 at its opposite ends. Clamp 52 includes a jaw 54 and a tongue 55 and clamp 53 includes a jaw 56 and a tongue 57. The locking means comprises first elongate, upwardly extending tab or fin 58 integrally formed along the upper edge only at one side of the jaw 53 and a second elongate, upwardly extending tab or fin 59 formed only in the corresponding upper edge of the jaw 56 to place both tabs or fins 58, 59 on one side of band 51. When the jaws 54 and 56 are in engagement as shown in FIGS. 5 and 6, the tab or fin 58 engages the side of tongue 57 and the tab or fin 59 engages the side of jaw 54. It can be seen that the tabs 58 and 59 will prevent relative lateral movement of the clamps 52 and 53.

Figure 7:
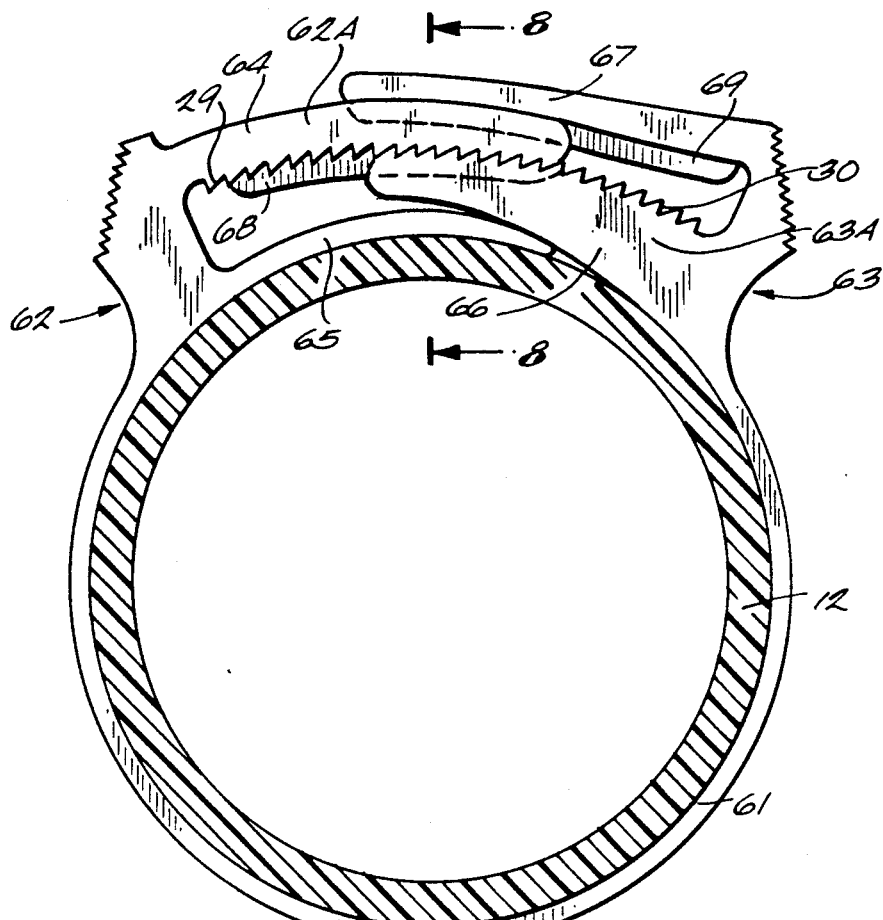
FIG. 7 is a side view showing an alternate embodiment of the invention.
Figure 8:
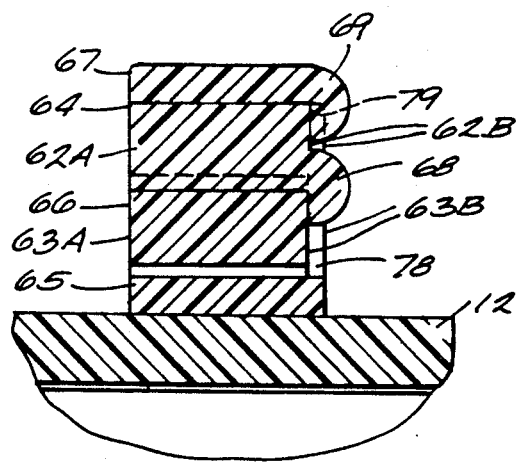
FIG. 8 is a view taken along lines 8—8 of FIG. 7.

FIGS. 7 and 8 illustrate another alternate embodiment of the invention. This embodiment also includes a band 61 for engaging a conduit 12. Band 61 is in the form of a loop having opposite ends with a first clamp means 62 at one opposite end and a second clamp means 63 at the other opposite end. Clamp means 62 includes first and second spaced apart portions comprising a jaw 64 and a tongue 65. Clamp 63 includes a third portion comprising a jaw 66 and preferably a fourth portion in the form of a tongue 67 with jaw 66 dimensioned to be received between jaw 64 and tongue 65. The first clamp means 62 has first axially opposite spaced apart lateral sides 62A, 62B and the second clamp means 63 has second axially opposite spaced apart lateral sides 63A, 63B.

A first locking means comprising a first elongate, downwardly extending tubular tab or fin 68 is provided only on one of the first axially spaced sides 62B on jaw 64 and a second elongated downwardly extending tab or fin 69 is formed only on the corresponding side 63B of tongue 67. The jaw 64 may include a first elongated recess 79 for receiving a second tab or fin 69. The jaw 66 may include a second elongated recess 78 for receiving first tab or fin 68. Both tabs or fins 68, 69 and recesses 78, 79 are on the same sides 62B, 63B. Thus, when the teeth 29, 30 of jaws 65, 66 are in engagement as shown in FIGS. 7 and 8, the tab or fin 68 engages lateral side 63B of jaw 66 and the tab or fin 69 engages lateral side 62B of jaw 65 to prevent relative lateral movement of clamps 52 and 53. If recesses 78, 79 are provided, the lateral side 63B, 62B will lie within the recesses and be engaged by tabs 68, 69.

In the embodiment of FIGS. 5, 6 and 7, 8, both of the tabs or fins 58, 59 and 68, 69 are on the same axial side 62A, 63A of their respective bands 51, 61. Therefore, for example, a single direction opening action mold can be utilized with the break line of the two mold halves located in a plane passing through the sides 62B, 63B of jaws 65, 66 on which tabs or fins 68, 69 are located.

While only a few embodiments of the invention have been illustrated and described, it is not intended to be limited thereby, but only by the scope of the appended claims.

I claim:

1. A clamp including band means formed into a loop having opposite ends and an axis; first and second clamp means disposed, respectively, on the opposite ends of said band means, said first clamp means including first and second spaced apart portions extending toward said second clamp means with each portion having first axially spaced sides and said second clamp means including a third portion extending toward said first clamp means having second axially spaces sides corresponding to said first axially spaced sides, the third portion of the second clamp means being receivable between the first and second portions of the first clamp means; first teeth means on said first portion and second teeth means on said third portion, said first and second teeth means being engageable and complementary, said teeth means being constructed and arranged to permit relative movement of said first and second clamp means toward each other but resisting relative movement of the clamp means in the opposite direction; a first locking means on only one of said first axial sides of said first portion and engageable with said one of said second axially spaced sides of said third portion for preventing lateral movement of said first clamp means in one axial direction relative to said second clamp means; and a second locking means on said third portion only on said same axial side as that on which said first locking means is located and engageable with said first portion for preventing lateral movement of said second clamp means in an axial direction opposite to said one axial direction.

2. The clamp set forth in claim 1 wherein said first locking means includes a first tab means extending along one of said first axial sides of one of said first and second portions for engaging said second axial side of said third portion corresponding to said one first axial side.

3. The clamp set forth in claim 1 wherein said second locking means includes a second tab means extending along one of said second axial sides of said third portion and engaging said first axial side of said first or second portions corresponding to said one second axial side for preventing relative lateral movement between said third portion and said first and second portions.

4. The clamp set forth in claim 1 wherein said axially spaced first and second side surfaces each extend generally normal to the engaging direction defined by the first and second teeth means, and said first and second locking means comprises tab means extending from only one of said side surfaces of each of the second and third portions lying on the same axial side.

5. The clamp set forth in claim 4 wherein said tab means are formed on only said first axial side of said second portion for engaging the corresponding second axial side of the third portion.

6. The clamp set forth in claim 1 wherein the first locking means includes a first elongated recess on only one of said first axial sides of one of said first or second portions and a first elongate fin means projecting integrally from said one first axial side of the other of said first or second portions and the second locking means includes a second elongated recess on only one of said second axial sides of said third portion corresponding to said one first axial side and a second elongate fin means projecting integrally from said one second axial side of said third portion, said first fin means engageable with said second elongated recess and said second fin means engaging said first elongated recess for preventing relative lateral movement of said first and second clamp means.

7. The clamp set forth in claim 6 wherein said first and second fin means extend for substantially the entire length of said portion from which they project.

8. The clamp set forth in claim 6 wherein said second clamp means includes a fourth portion spaced from said third portion, said first portion being receivable between said third and fourth portions, said first fin means projecting from said second portion and engaging said third portion when received between said third and fourth portion and said second fin means extending from said third portion and engaging said first portion when received between said first and second portions.

9. A clamp including band means formed into a loop having opposite ends and an axis; first and second clamp means disposed, respectively, on the opposite ends of said band means, said first clamp means including first and second spaced apart portions extending toward said second clamp means with each portion having first axially spaced sides and said second clamp means including a third portion extending toward said first clamp means having second axially spaces sides corresponding to said first axially spaced sides, the third portion of the second clamp means being receivable between the first and second portions of the first clamp means; first teeth means on said first portion and second teeth means on said third portion, said first and second teeth means being engageable and complementary, said teeth means being constructed and arranged to permit relative movement of said first and second clamp means toward each other but resisting relative movement of the clamp means in the opposite direction; a first locking means on only one of said first axial sides of one of said first and second portions and engageable with said third portion for preventing lateral movement of said first clamp means in one axial direction relative to said second clamp means, said first locking means including a first elongated recess on only one of said first axial sides of one of said first or second portions and a first elongate fin means projecting integrally from said one first axial side of the other of said first or second portions; and a second locking means on said third portion only on said same axial side as that on which said first locking means is located and engageable with at least one of said first and second portions for preventing lateral movement of said second clamp means in an axial direction opposite to said one axial direction, said second locking means further including a second elongated recess on only one of said second axial sides of said third portion corresponding to said one first axial side and a second elongate fin means projecting integrally from said one second axial side of said third portion, said first fin means engageable with said second elongated recess and said second fin means engaging said first elongated recess for preventing relative lateral movement of said first and second clamp means.

10. The clamp set forth in claim 9 wherein said first and second fin means extend for substantially the entire length of said portion from which they project.

11. The clamp set forth in claim 9 wherein said second clamp means includes a fourth portion spaced from said third portion, said first portion being receivable between said third and fourth portions, said first fin means projecting from said second portion and engaging said third portion when received between said third and fourth portion and said second fin means extending from said third portion and engaging said first portion when received between said first and second portions.

* * * * *